(12) United States Patent
Dos-Reis et al.

(10) Patent No.: US 9,465,045 B2
(45) Date of Patent: Oct. 11, 2016

(54) AIRCRAFT INCLUDING A SYSTEM FOR MEASURING PRESSURE, AND AN ASSOCIATED METHOD

(71) Applicant: AIRBUS OPERATIONS (SAS), Toulouse (FR)

(72) Inventors: Michel Dos-Reis, Plaisance du Touch (FR); Nicolas Blanchard, Soreze (FR)

(73) Assignee: Airbus Operations (SAS), Toulouse (FR)

(*) Notice: Subject to any disclaimer, the term of this patent is extended or adjusted under 35 U.S.C. 154(b) by 0 days.

(21) Appl. No.: 14/448,506

(22) Filed: Jul. 31, 2014

(65) Prior Publication Data

US 2015/0039160 A1    Feb. 5, 2015

(30) Foreign Application Priority Data

Jul. 31, 2013  (FR) ..................................... 13 57567

(51) Int. Cl.

| G05D 1/00 | (2006.01) |
|---|---|
| G01P 5/165 | (2006.01) |
| B64D 43/00 | (2006.01) |
| G01L 19/00 | (2006.01) |
| G01L 19/08 | (2006.01) |
| G01P 21/02 | (2006.01) |
| B64D 45/00 | (2006.01) |

(52) U.S. Cl.
CPC ............... *G01P 5/165* (2013.01); *B64D 43/00* (2013.01); *G01L 19/0069* (2013.01); *G01L 19/083* (2013.01); *G01L 19/086* (2013.01); *G01P 21/025* (2013.01); *B64D 2045/0085* (2013.01)

(58) Field of Classification Search
CPC ..... G01C 5/005; G01C 23/00; G01L 27/007; G01L 19/00; G01L 19/0069; G01L 19/083; G01P 13/025; G01P 13/0006; G01P 21/025; G01P 5/00; G01P 5/14; G01P 5/16; G01P 5/165; A63H 27/12; B64D 15/20
USPC ........ 701/3, 4, 5, 6, 7, 8, 10, 15, 16, 18, 24, 701/25, 26, 27, 38; 244/23 A, 23 B, 36, 211, 244/214, 215, 56, 179, 180, 181, 80, 90 R, 244/90 A; 340/963, 967–970, 973, 974, 340/975, 977, 978; 342/38, 63, 176, 357.2, 342/357.33, 357.36, 462, 18, 34, 35, 49, 58, 342/83, 81, 84, 87, 157, 199, 357.53; 703/9, 11, 12
See application file for complete search history.

(56) References Cited

U.S. PATENT DOCUMENTS

| 2005/0278120 | A1* | 12/2005 | Manfred | ................. | G01W 1/10 702/2 |
|---|---|---|---|---|---|
| 2008/0161014 | A1* | 7/2008 | Monnerat | ............. | H04W 64/00 455/456.1 |
| 2013/0048782 | A1 | 2/2013 | Bohlen et al. | | |

FOREIGN PATENT DOCUMENTS

WO    WO-2011-134931    * 11/2011

OTHER PUBLICATIONS

Bede Design—No. 27; Paul Bickle, Airspeed Calibration, Soaring, Jan. 1971, Bede Aircraft, Inc. 355 Richmond Road, Cleveland, Ohio—44143.*
Bede Design—No. 28,Paul Bickle, Airspeed Calibration, Soaring, Jan. 1971, Bede Aircraft, Inc. 355 Richmond Road, Cleveland, Ohio—44143.*
FR Search Report and Written Opinion for FR Application No. 1357567, dated Apr. 24, 2014.
Bickle, P., "Trailing Cone Static Source", Bede Design No. 28, (Jan. 31, 1971) 1 page.

* cited by examiner

*Primary Examiner* — Muhammad Shafi
(74) *Attorney, Agent, or Firm* — Nixon & Vanderhye P.C.

(57) ABSTRACT

The invention relates to an aircraft (10) having a system for measuring a static reference pressure in flight, which system comprises:
  a pressure sensor (22) connected to the rear portion of the aircraft by a cable (16) and associated with a pressure intake (24) that is located, in flight, in an undisturbed zone downstream from the aircraft, the pressure signal (22) being suitable firstly for measuring a pressure coming from the pressure intake (24) and secondly for transmitting a signal representative of the measured pressure, e.g. an electric signal, to the aircraft; and
  a system (34) on board the aircraft, which system is suitable for determining a pressure measurement firstly from the transmitted signal and secondly from a position of the pressure sensor (22) relative to the aircraft (10). Pressure is measured dynamically while the aircraft is climbing or descending.

31 Claims, 4 Drawing Sheets

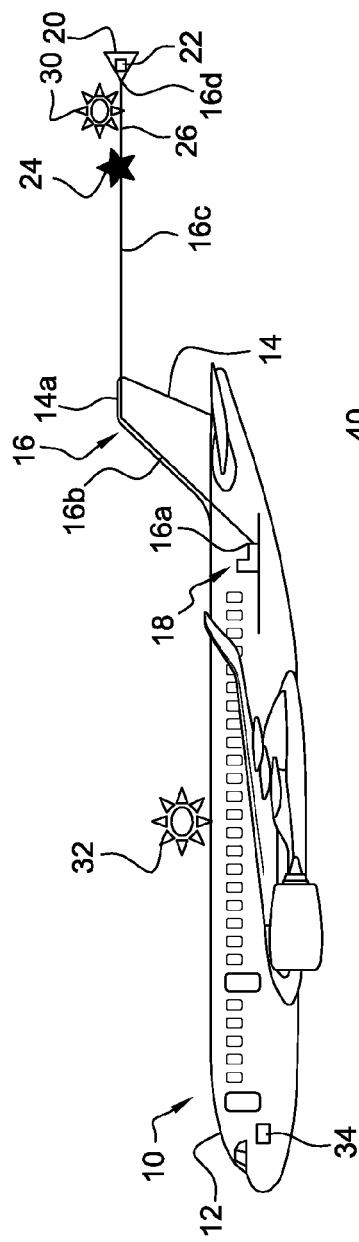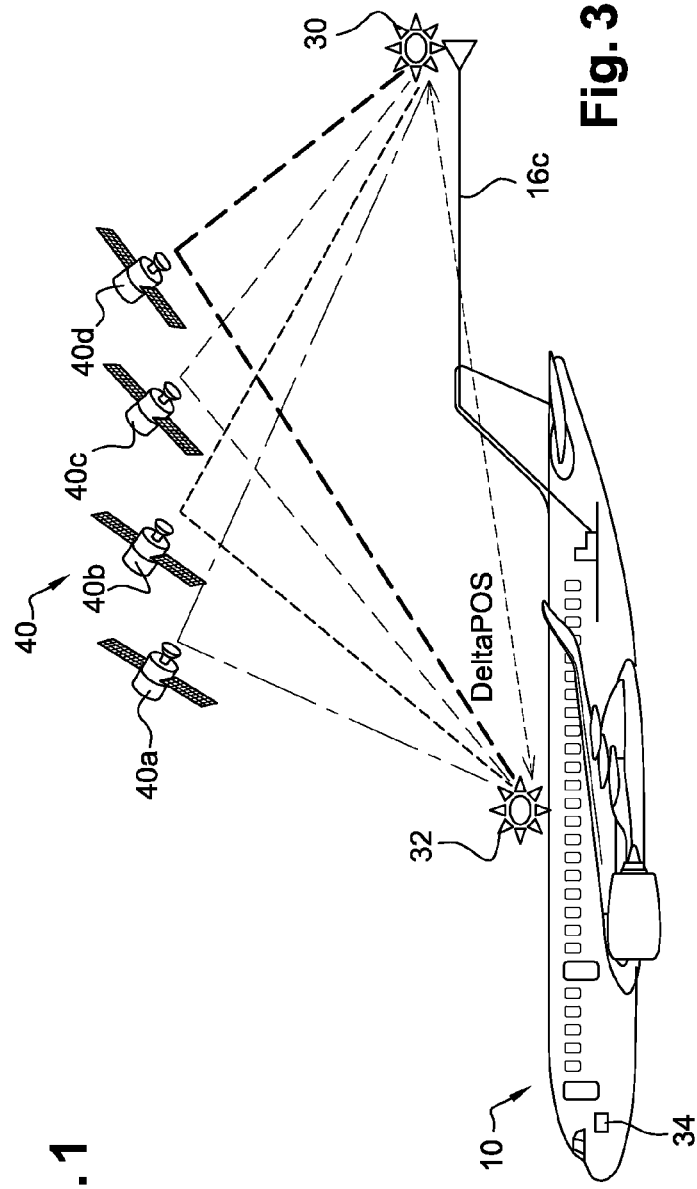
Fig. 1
Fig. 3

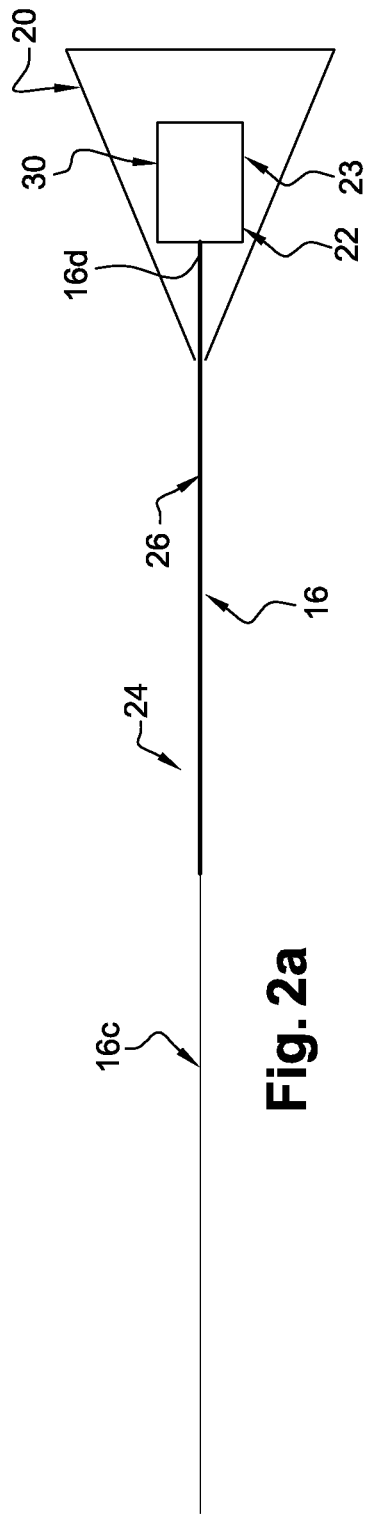
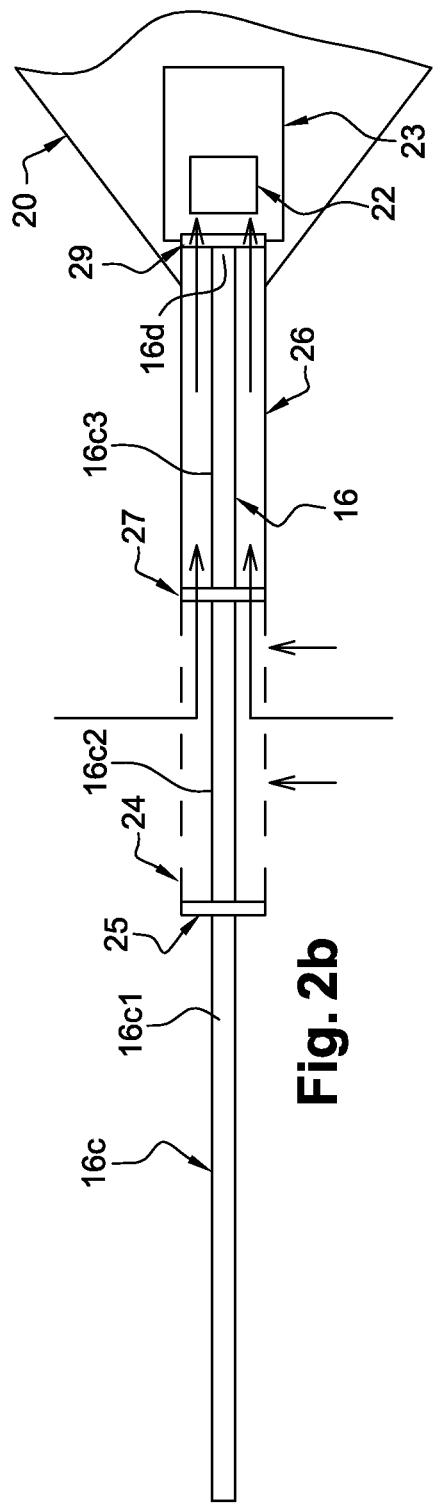
Fig. 2a
Fig. 2b

AIRCRAFT INCLUDING A SYSTEM FOR MEASURING PRESSURE, AND AN ASSOCIATED METHOD

This application claims priority to FR Application No. 1357567 filed 31 Jul. 2013, of which the entire content is incorporated herein by reference.

The invention relates to an aircraft having a pressure measurement system.

It is useful to be able to measure a pressure dynamically while in flight, which pressure can subsequently be used as a reference pressure, e.g. for calibrating Pitot tubes that are placed on board.

In a first aspect, the invention thus proposes an aircraft including a system for measuring pressure in flight, the aircraft being characterized in that the measurement system comprises:

at least one pressure sensor connected to the rear portion of the aircraft by an electric cable, said at least one pressure sensor being associated with a pressure intake that is arranged downstream from the aircraft when it is in flight and in a zone that is not disturbed by the turbulent flow created around the aircraft, the pressure intake being arranged upstream from said at least one pressure sensor and being connected thereto by at least one air feed tube, said at least one pressure sensor being suitable firstly for measuring an air pressure from at least one pressure signal coming from said pressure intake, and secondly for transmitting at least one electric signal representative of said pressure measurement to the aircraft via the electric cable; and a system on board the aircraft and suitable for determining at least one pressure measurement firstly from said at least one transmitted electric signal and secondly from a dynamically determined position of said at least one pressure sensor relative to the aircraft.

By positioning said at least one pressure sensor behind the aircraft and by connecting it thereto via an electric cable, said at least one pressure sensor is close to the pressure intake. The path to be traveled by the air pressure signal(s) up to said at least one sensor is thus short. This means that there is no or practically no need to wait for the pressure measurement taken by said at least one sensor to stabilize. The electric signal(s) representative of the measured signal is/are then transmitted to the aircraft and taken into account by the on-board system for the purpose of determining a pressure measurement dynamically. This makes it possible to obtain pressure measurements even during stages of flight of the aircraft that are dynamic, i.e. while it is climbing or descending.

According to other characteristics taken in isolation or in combination with one another:

said at least one air feed tube defines a passage for conveying at least one air pressure signal in a first direction, from the pressure intake to said at least one pressure sensor, and the electric cable allows said at least one electric signal representative of the measured air pressure to pass in a second direction opposite to the first direction from said at least one pressure sensor to the aircraft;

the electric cable is arranged inside the air feed tube;

the air feed tube and the electric cable are arranged inside a sleeve that is airtight relative to the outside air;

the measurement system includes an electropneumatic connector that is airtight relative to the outside air and that is arranged between said at least one air feed tube and said at least one pressure sensor, the connector serving firstly to connect the electric cable to said at least one pressure sensor, and secondly to connect said at least one air feed tube to said at least one pressure sensor in order to feed said at least one air pressure signal thereto as conveyed by the air feed tube and coming from the pressure intake;

the measurement system includes an electropneumatic connector that is airtight relative to the outside air and that is arranged between the intake sensor and said at least one air feed tube, the connector serving firstly to connect together two portions of the electric cable, and secondly to pass said at least one air pressure signal coming from the pressure intake inside said at least one air feed tube;

each connector has a plurality of through orifices that are arranged around a central electrical connector for connecting the electric cable, the through orifices being suitable for putting the passage of the air feed tube into communication with the pressure intake for one connector and with said at least one pressure sensor for the other connector;

each electropneumatic connector includes a pneumatic connection that is suitable for putting the passage of the air feed tube into communication with the pressure intake for one connector and with said at least one pressure sensor for the other connector, the pneumatic connection being arranged beside a central electrical connector for connecting the electric cable;

the measurement system includes a perforated tube for static pressure intake, which tube surrounds the electric cable;

the perforated tube is connected to the electric cable via a connector that is airtight relative to the outside air;

the perforated tube extends between the connector connected to the air feed tube and the connector connected to the electric cable;

the measurement system includes means for dynamically determining the position of said at least one pressure sensor relative to the aircraft in flight;

the means for dynamically determining the position of said at least one pressure sensor relative to the aircraft comprise two DGPS sensors, one of them being positioned beside said at least one pressure sensor, and the other one of them being positioned on the aircraft, each of the two DGPS sensors being suitable for receiving position information coming from the same constellation of satellites (which constellation comprises at least three satellites, for example), the determination means being suitable for dynamically determining the position of said at least one pressure sensor relative to the aircraft on the basis of the relative position of the two DGPS sensors;

said at least one pressure sensor and the pressure intake are as close as possible to each other;

said at least one pressure sensor is arranged inside a stabilizer cone that is fastened to the free end of the cable opposite from its end fastened to the aircraft;

the pressure intake is arranged along the cable; and the measured pressure is a reference pressure, e.g. a static reference pressure.

In a second aspect, the invention also provides a method of measuring a pressure during the flight of an aircraft, the method being characterized in that it comprises the following steps:

obtaining at least one pressure signal in a zone that is situated downstream from the aircraft and that is undisturbed by the turbulent flow created around the aircraft;

transmitting at least one electric signal representative of said at least one pressure signal to on board the aircraft; and determining at least one pressure measurement firstly from said at least one transmitted electric signal and secondly from a position of said undisturbed zone relative to the aircraft.

According to other characteristics taken in isolation or in combination with one another:

the method includes a step of dynamically determining the position of said undisturbed zone where the pressure is obtained relative to the aircraft;

the method includes a prior step of determining the position of said undisturbed zone and the position of a predetermined zone of the aircraft making use of the same constellation of satellites (which constellation comprises at least three satellites, for example);

the measured pressure is a reference pressure, e.g. a static reference pressure.

Other characteristics and advantages appear from the following description given purely by way of non-limiting example and made with reference to the accompanying drawings, in which:

FIG. 1 is a general diagrammatic view of an aircraft in an embodiment of the invention;

FIG. 2a is a general diagrammatic view of the arrangement of a pressure sensor and a pressure intake relative to a cable connected to the FIG. 1 aircraft;

FIG. 2b is an enlarged fragmentary diagrammatic view of the FIG. 2a arrangement;

FIG. 3 is a general diagrammatic view of the FIG. 1 aircraft while performing a pressure measurement method in an implementation of the invention.

Figure 2C:
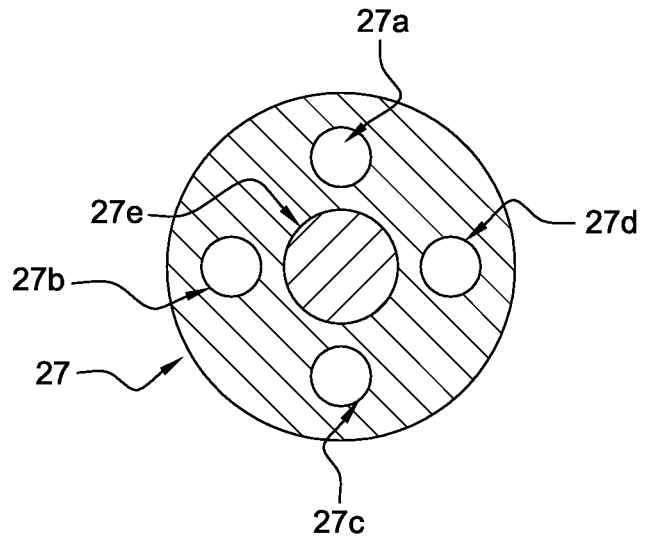
FIG. 2c is an enlarged diagrammatic view in cross-section of an electropneumatic connector used in the FIG. 2b arrangement.

As shown in FIG. 1 and given overall reference 10, an aircraft in an embodiment of the invention comprises a fuselage 12 and a tail fin 14. The figure shows the aircraft in flight.

The aircraft has a system for measuring pressure, in particular a reference pressure, which system comprises various elements.

The pressure measurement system comprises an electric cable 16 that is fastened to the aircraft. For example, the cable 16 is fastened at a first end 16a to a winch 18 housed in the rear portion of the aircraft.

The cable 16 is shown in the figure in a deployed position for taking pressure measurements during a test stage in flight. When it is not desired to take any pressure measurements, the cable is wound onto the winch.

The cable is taken to the top end 14a of the fin, inside the fin, following the path shown in FIG. 1.

When the aircraft is in flight, the free portion of the cable, referenced 16c, extends from the fin 14, downstream therefrom to the opposite, second end 16d of the cable, which is freely floating. This second end 16d has a stabilizer cone 20 having the purpose of stabilizing the cable and its accessories and of tensioning it in a substantially horizontal configuration.

The cable 16 is long enough to ensure that along and around the cable, at a distance from the aircraft, there is a zone that is not disturbed by the turbulent flow created around the aircraft as a result of it penetrating through the air. This undisturbed zone enables pressure measurements to be taken that are influenced little or not at all by the aircraft and by the flow disturbances that it generates.

The pressure measurement system also has a pressure sensor 22 fastened to the free end 16d of the cable (FIG. 2a). The sensor is arranged inside the stabilizer cone 20 so as to be positioned in an undisturbed zone. The cable 16 provides the electrical power needed by the sensor 22 and it performs a mechanical function of holding the sensor. By way of example, the pressure sensor is a sensor sold by the company Paroscientific under the commercial reference 6000-15A.

The pressure measurement system includes a static pressure intake 24 situated upstream from the sensor 22 along the free portion of the cable 16c. The pressure intake 24 is connected to the sensor by a tube 26 for feeding air (pressure signal or signals) to the sensor, as shown in the enlarged fragmentary view of FIG. 2b. The tube 26 comprises both an inner portion dedicated to conveying the air from the pressure intake (pressure signals) in a first direction, and an outer portion dedicated to passing the electric cable along which the electric signal(s) representative of the measured pressure is/are transmitted in an opposite, second direction from the pressure sensor 22 to the aircraft. It should be observed that the pressure sensor 22 may for example be housed in a box 23 fastened to the tube 26 inside the cone 20.

More particularly, the pressure intake is made in the form of an interface part 24 between the cable 16 and the tube 26 and that is fastened to both of these elements. The interface part 24 is in the form of a tube having a cylindrical wall that is perforated for the static pressure intake. This interface part includes at its base an electrical connector 25 that is airtight relative to outside air and that enables it to be connected to the cable 16.

More particularly, the free portion 16c of the cable has a plurality of successive segments that are connected to one another by electrical connectors, as described below. In particular, the electrical connector 25 connects together two cable segments 16c1 and 16c2 (FIG. 2b).

An electropneumatic connector 27 that is airtight relative to the outside air is provided at the junction between the pressure intake part 24 and the air feed tube 26 both to connect together the two segments 16c2 and 16c3 of the electric cable 16 and to convey air (pressure signal or signals) in an air passage defined inside the tube which surrounds the cable 16. FIG. 2c is a cross-section view of the connector 27, which has a plurality of through orifices 27a-d (e.g. four orifices) that are arranged around a central electrical connector 27e for connecting together the two segments 16c2 and 16c3 of the electric cable 16. The through orifices 27a-d are suitable for putting the pressure intake 24 into communication with the internal annular duct of the air feed tube 26 that surrounds the cable segment 16c3.

Another electropneumatic connector 29 that is airtight relative to the outside air and identical to the connector 27 is provided at the junction between the tube 26 and the sensor 22 (e.g. at the junction between the tube 26 and the box 23 containing the sensor 22) serving both to connect the segment 16c3 of the cable 16 to the sensor 22 and to feed air (pressure signal or signals) to said sensor 22. The cable 16 passes through the connector 25, the interface part 24, the connector 27, the hollow tube 26, and the connector 29 in order to be connected to the pressure sensor 22.

The connection made by the connector 29 with the sensor 22 (or the box 23) for the air coming from the pressure intake 24 and that is conveyed by the tube 26 is provided in a manner that is leaktight relative to ambient air (air in the stabilizer cone and around it) so as to avoid disturbing the measurements. The pressure intake 24 is situated at a distance from the sensor 22 that is short compared with the length of the cable, thereby locating it at a considerable distance from the aircraft. The pressure intake is thus placed in a zone that is not disturbed by the turbulent flow that is created around the aircraft as a result of it penetrating through the air.

By way of example, the total length of the cable is 103 meters (m), the length of the free or floating portion of the cable 16c is 100 m, and the distance between the pressure intake 24 and the sensor 22 is at least 2 m, e.g. 2.5 m. It is preferable for this distance not to be too short in order to avoid the turbulence generated by the stabilizer cone 20 disturbing the upstream pressure intake zone.

Nevertheless, depending on the size of the stabilizer cone, in particular if it is small in size, the distance between the pressure intake and the sensor may be less than 2 m.

Under such circumstances, the reduced external size of the cone generates less electrodynamic disturbance than would be generated by a cone of larger size.

Figure 2D:
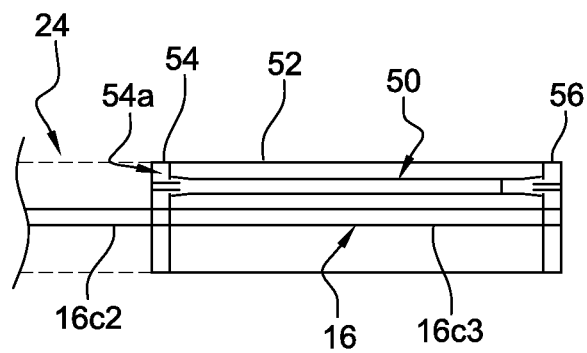
FIG. 2d is a fragmentary diagrammatic view of a variant embodiment of the FIG. 2b arrangement.
Figure 2E:
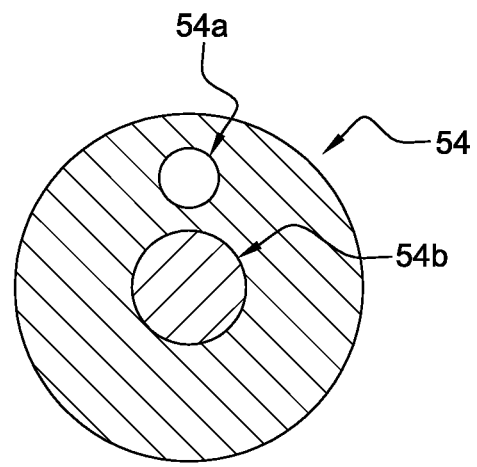
FIG. 2e is an enlarged diagrammatic view in cross-section of an electropneumatic connector used in the FIG. 2d arrangement.

FIGS. 2d and 2e show a variant embodiment of the arrangement shown in FIGS. 2b and 2c.

In this variant, the segment 16c3 of cable 16 and a fine air feed tube or duct 50 are both housed within a sleeve 52 that is airtight relative to outside air, e.g. a sleeve of cylindrical shape.

Two identical electropneumatic connectors 54 and 56 are mounted at the two opposite ends of the sleeve 25.

Each electropneumatic connector 54, 56 has the appearance shown in FIG. 2e (cross-section) for the connector 54. The connector 54 has a pneumatic connection 54a arranged in a circular plate and it is suitable for putting the pressure intake 24 into communication with the passage defined inside the air feed tube 50. More particularly, and as shown in FIG. 2d, the pneumatic connection 54a includes a nozzle that projects from the plate (extending towards the inside of the sleeve 52) with one of the free ends of the fine tube 50 being engaged thereon (the same configuration is used with a corresponding nozzle of the plate of the connector 56 and the opposite end of the tube 50). The connector 54 also has a central electrical connector 54b for connecting together the two segments 16c2 and 16c3 of the electric cable 16 (and correspondingly the connector 56 has a central electrical connector for connecting the segment 16c3 to the sensor 22). The pneumatic connection 54a is arranged beside the central electrical connector 54b, at its periphery, in a position corresponding geometrically with the arrangement of the tube 50 and the segment 16c3 of cable. It should be observed that in another variant that is not shown a plurality of tubes analogous to the tube 50 could be used for conveying pressure signals to the sensor 22.

The pressure measurement system also has two DGPS type sensors 30 and 32 shown symbolically in highly diagrammatic manner in FIG. 1. A first sensor 30 is positioned beside the pressure sensor 22 (the cable 16 also serves to hold the sensor 30 and to power it), inside the box 23 (FIG. 2b), and a second sensor 32 is positioned on board the aircraft, e.g. on the top portion of the fuselage 12 (FIG. 1). These are two independent GPS position sensors.

The pressure measurement system includes an on-board system 34 having calculation and storage means, which system may for example be located in the cabin. FIG. 3 shows the aircraft being put into a situation for performing the reference pressure measurement by means of a pressure measurement method in an embodiment of the invention. FIG. 3 shows a satellite constellation 40 comprising a plurality of satellites, e.g. at least four satellites 40a-d in GPS technology. Each position sensor 30 and 32 measures its own position relative to the same constellation of satellites. It is important for the satellites that are taken into account by each sensor to be the same. To ensure that this is so, the sensor 32 on board the aircraft sends to the sensor housed in the cone the references of the satellites that it is taking into account, or conversely the sensor 30 transmits this information to the sensor 32.

Figure 4:
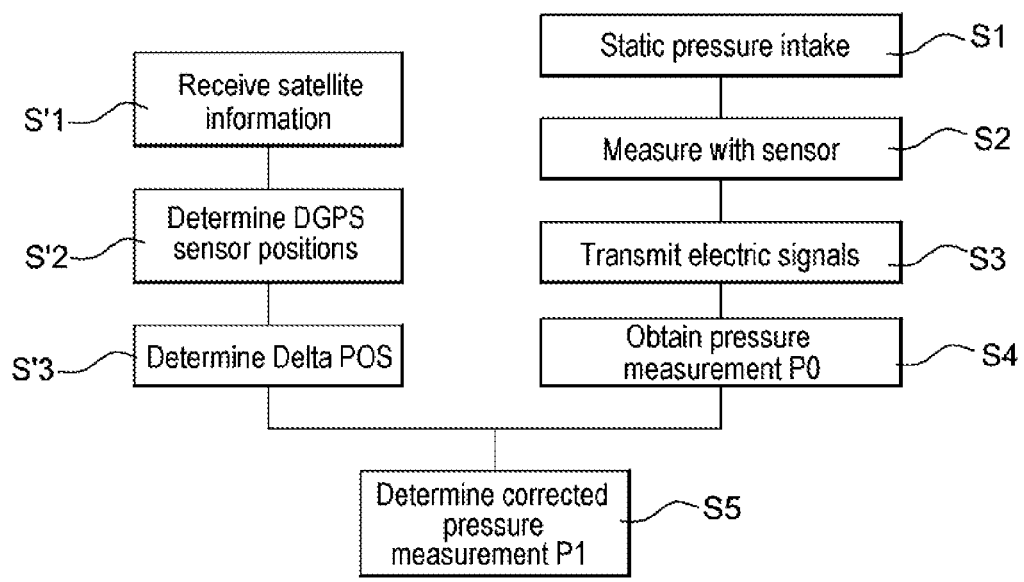
FIG. 4 is a flow chart of a pressure measurement method in an implementation of the invention.

FIG. 4 is a flow chart showing the various steps of the pressure measurement method in an embodiment of the invention.

The flow chart is in the form of two parallel branches: one relates to determining the position of the sensor 22 and the other relates to measuring pressure. These two branches are shown in parallel to illustrate the fact that there is no preferred order for performing steps between the two branches. The steps of the branches may be performed simultaneously or in quasi-simultaneous manner, or it is possible to select some other order for using the branches.

The right-hand branch is described first. Nevertheless, this does not mean that it is performed before the left-hand branch.

The flow chart has a first step S1 during which static pressure is taken using the pressure intake 24. Pressure signals representative of the corresponding physical magnitude are conveyed by the tube 26 to the pressure sensor 22 (FIGS. 2a-b).

During the following step S2, the sensor 22 measures the corresponding physical magnitude (measures static pressure) and generates electric signals on the basis of the received pressure signals (transforms the received signals). These electric signals are representative of the received pressure signals and thus of the static pressure as measured at a distance from the aircraft.

The electric signals are transmitted by the cable 16 to the aircraft (step S3), and in particular to the on-board system 34 which thus obtains in particular the static pressure measurement P0 performed in the undisturbed zone (step S4).

This measurement is made at the altitude where the pressure sensor 22 is situated.

The left-hand branch of the flow chart serves to determine the position of the sensor 22 relative to the aircraft.

During the first step S'1 of the left-hand branch, the DGPS sensors 30 and 32 both receive position information from the satellites. As mentioned above, the sensor 32 transmits the references of the satellites it is using to the sensor 30 so as to ensure that both sensors use the same satellites for determining their respective positions.

This position information enables each of the two sensors to determine the coordinates of its own position using a technique that is known as trilateration in GPS technology (step S'2).

The coordinates of the positions of the two sensors 30 and 32 are transmitted to the on-board system 34, which takes the difference to calculate their relative position DeltaPOS (step S'3). The position of the pressure sensor 22 relative to a predetermined zone of the aircraft is thus obtained dynamically during the flight, practically in real time (i.e. the position of the undisturbed zone where the measurement was made is thus obtained relative to the position where the sensor 32 is located).

The on-board system 34 thus has both the pressure measurement P0 made at the altitude of the pressure sensor 22, and also the position of the sensor 22 relative to the aircraft.

The on-board system 34 also has standard atmosphere tables available that establish correspondence between altitude and pressure.

By taking these pieces of data into account, the on-board system 34 is thus capable of determining a corrected pressure measurement at a known altitude P1 (step S5). By way of example, this altitude may be the altitude at which a Pitot tube on board the aircraft is located. This altitude is known, as is the difference in altitude between itself and the altitude of the sensor 22. Such a static pressure measurement serves to calibrate the on-board Pitot tubes.

This corrected static pressure measurement is obtained in flight both dynamically and quickly. This is made possible in particular because of the arrangement of the pressure intake 24 and of the pressure sensor 22 in a measurement zone that is not disturbed, and because measurement signals that are representative of the physical magnitude of interest being measured are transmitted to the aircraft. This would not be true if the physical magnitude (pressure) were transmitted to the aircraft via a hollow tube and measured only on board the aircraft. Under such circumstances, it would then be necessary to wait for a period of time to allow the pressure from the intake to stabilize before obtaining values that are reliable.

A plurality of measurements (whether dynamic or static) can thus be made consecutively during any stage of flight: climbing, descending, cruising, . . . .

The number of flying hours needed for testing and certification can thus be reduced.

Since the positions of the two sensors 30 and 32 are obtained using the same satellites, they are both affected by the same error factors. Thus, by determining the relative position between the two sensors 30 and 32 it is possible to eliminate most of these common error factors, and in particular most absolute positioning errors.

By way of example, accuracy of a few centimeters is obtained concerning the relative positioning of the sensors 30 and 32. The accuracy with which the positions of the two sensors 30 and 32 are determined and thus with which the position of the pressure sensor 22 is determined relative to the aircraft can be improved by using a larger number of satellites. By way of example, it is possible to obtain accuracy of the order of 5 centimeters (cm) in the positioning of the sensors by using about ten satellites. The system and the measurement method of the above-described embodiment are insensitive to changes in the altitude of the pressure sensor 22, since these are taken into account when determining the relative position of the two sensors 30 and 32. The winch 18 is used for carrying the cable 16 and several meters of tube 26 (including the interface part 24) and for deploying the entire assembly into its working position (FIGS. 1, 2a-b, and 3). The winch therefore does not need to be bulky, thus making installation of the assembly quite quick and easy.

It should be observed that the winch 18 could alternatively be situated at the top of the tail fin, inside it.

Transmitting electric signals representative of the pressure signals received by the sensor 22 by wire over the electric cable 16 (from the sensor 22) is reliable and does not generate disturbances that might affect the accuracy of the final measurements on board the aircraft.

Even if the sensor 22 is subjected to unwanted movements of greater or smaller amplitude, signal transmission via the cable 16 remains unaffected. Any signal transmitted by the cable 16 is received by the aircraft in real time. The same would not apply to a wireless connection.

Furthermore, the cable 16 serves to power the pressure sensor(s) 22 and the DGPS sensor 30 electrically, thereby avoiding any problem associated with possible battery life of such sensors (both lifetime and the weight of one or more necessary batteries, . . . ).

In a variant that is not shown, the horizontal stabilizer element 20 may be of a shape other than a cone, providing that it performs the same function of tensioning the cable horizontally so that the pressure intake is arranged horizontally.

In another variant that is not shown, the on-board system 34 could alternatively be placed in a location other than the cabin, such as for example in the avionics bay or in the rear of the aircraft, e.g. close to the cable 16.

The invention claimed is:

1. An aircraft including a pressure measuring system for measuring pressure in flight, the aircraft pressure measuring system comprising:
    at least one pressure sensor located outside of the aircraft,
    an electric cable by which the at least one pressure sensor is deployably connected to a rear portion of the aircraft,
    a pressure intake that is located outside of and downstream from the aircraft when the aircraft is in flight and that is in a zone that is not disturbed by turbulent flow created around the aircraft when the aircraft is in flight, the pressure intake being located upstream from said at least one pressure sensor,
    at least one air feed tube connecting the pressure intake to the pressure sensor, the at least one air feed tube being an air passage that feeds air to the at least one pressure sensor,
    said at least one pressure sensor being constructed firstly for measuring an air pressure from at least one pressure signal coming from said pressure intake, and secondly for transmitting to the aircraft via the electric cable at least one electric signal representative of the pressure measured by the pressure sensor,
    a first sensor outside of the aircraft that measures a first position corresponding to the at least one pressure sensor,
    a second sensor position on-board the aircraft that measures a second position corresponding to the aircraft, and
    an on-board system located on the aircraft that determines at least one pressure measurement using the at least one sent electric signal and the first position of said at least one pressure sensor relative to the second position of the aircraft.

2. The aircraft according to claim 1, wherein said at least one air feed tube defines a passage for conveying at least one air pressure signal in a first direction, from the pressure intake to said at least one pressure sensor, and the electric cable allows said at least one electric signal representative of the measured air pressure to pass in a second direction opposite to the first direction from said at least one pressure sensor to the aircraft.

3. The aircraft according to claim 2, wherein the electric cable is arranged inside the air feed tube.

4. The aircraft according to claim 3, wherein each connector has a plurality of through orifices that are arranged around a central electrical connector for connecting the electric cable, the through orifices being suitable for putting the passage of the air feed tube into communication with the pressure intake for the connector and with said at least one pressure sensor for the connector.

5. The aircraft according to claim 2, wherein the air feed tube and the electric cable are arranged inside a sleeve that is airtight relative to the outside air.

6. The aircraft according to claim 5, wherein each electropneumatic connector includes a pneumatic connection that is suitable for putting the passage of the air feed tube into communication with the pressure intake for the connector and with said at least one pressure sensor for the connector, the pneumatic connection being arranged beside a central electrical connector for connecting the electric cable.

7. The aircraft according to claim 1, wherein the measurement system includes an electropneumatic connector that is airtight relative to the outside air and that is arranged between said at least one air feed tube and said at least one pressure sensor, the connector serving firstly to connect the electric cable to said at least one pressure sensor, and secondly to connect said at least one air feed tube to said at least one pressure sensor in order to feed said at least one air pressure signal thereto as conveyed by the air feed tube and coming from the pressure intake.

8. The aircraft according to claim 7, wherein the measurement system includes an electropneumatic connector that is airtight relative to the outside air and that is arranged between the pressure intake and said at least one air feed tube, the connector serving firstly to connect together two portions of the electric cable, and secondly to pass said at least one air pressure signal coming from the pressure intake inside said at least one air feed tube.

9. The aircraft according to claim 8, wherein the perforated tube extends between the connector connected to the air feed tube and the connector connected to the electric cable.

10. The aircraft according to claim 1, wherein the measurement system includes a perforated tube for static pressure intake, which tube surrounds the electric cable.

11. The aircraft according to claim 10, wherein the perforated tube is connected to the electric cable via a connector that is airtight relative to the outside air.

12. The aircraft according to claim 1, wherein it includes means for dynamically determining the position of said at least one pressure sensor relative to the aircraft in flight.

13. The aircraft according to claim 1, wherein said at least one pressure sensor and the pressure intake are as close as possible to each other.

14. The aircraft according to claim 1, wherein said at least one pressure sensor is arranged inside a stabilizer cone that is fastened to a free end of the electric cable opposite from another end of the electric cable fastened to the aircraft.

15. The aircraft according to claim 1, wherein the pressure intake is arranged along the electric cable.

16. The aircraft according to claim 1, wherein the measured pressure is a reference pressure.

17. The aircraft according to claim 1, wherein the on board system determines a corrected pressure measurement at a known altitude at which a Pitot tube on board the aircraft is located, and wherein the corrected static pressure measurement is used to calibrate the on-board Pitot tube.

18. The aircraft according to claim 1, wherein the on-board system includes standard atmosphere tables available that establish correspondence between altitude and pressure.

19. The aircraft according to claim 1, wherein the aircraft carries a winch which is used for carrying the electric cable and the air feed tube and for deploying the electric cable and the air feed tube and thereby the at least one pressure sensor into its in-flight position.

20. An aircraft including a system for measuring pressure in flight, the aircraft pressure measuring system comprising:
at least one pressure sensor located outside of the aircraft,
an electric cable by which the at least one pressure sensor is deployably connected to a rear portion of the aircraft,
a pressure intake associated with the at least one pressure sensor that is located outside of and downstream from the aircraft when the aircraft is in flight and that is in a zone that is not disturbed by turbulent flow created around the aircraft when the aircraft is in flight, the pressure intake being located upstream from the at least one pressure sensor,
at least one air feed tube connecting the pressure intake to the pressure sensor,
said at least one pressure sensor being constructed firstly for measuring an air pressure from at least one pressure signal coming from said pressure intake, and secondly for transmitting to the aircraft via the electric cable at least one electric signal representative of the pressure measured by the at least one pressure sensor; and
an on-board system on the aircraft that determines at least one pressure measurement firstly from said at least one sent electric signal and secondly from a position of said at least one pressure sensor relative to a position of the aircraft, and
means for dynamically determining the position of said at least one pressure sensor relative to the aircraft in flight, and
wherein the means for dynamically determining the position of said at least one pressure sensor relative to the aircraft comprise two DGPS sensors, one of the DGPS sensors being positioned beside said at least one pressure sensor to provide the position of the at least one pressure sensor, and the other of the DGPS sensors being positioned on the aircraft to provide the position of the aircraft, each of the two DGPS sensors being constructed for receiving position information coming from a same constellation of satellites, the determination means being constructed for dynamically determining the position of said at least one pressure sensor relative to the position of the aircraft on the basis of the relative positions of the two DGPS sensors.

21. The aircraft according to claim 20, wherein the satellite constellation has at least three satellites.

22. The aircraft according to claim 20, wherein the on board system determines a corrected pressure measurement at a known altitude at which a Pitot tube on board the aircraft is located, and wherein the corrected static pressure measurement is used to calibrate the on-board Pitot tube.

23. A method of measuring a pressure during the flight of an aircraft, the method comprising:
obtaining at least one pressure signal via at least one pressure sensor connected to a pressure intake which is located outside of the aircraft and arranged in a zone that is situated downstream from the aircraft and that is undisturbed by turbulent flow created around the aircraft when the aircraft is in flight, the pressure intake being arranged upstream from the at least one pressure sensor and being connected thereto by at least one air feed tube, which is an air passage that feeds air to the at least one pressure sensor;
transmitting via an electric cable by which the at least one pressure sensor is deployably connected to a rear portion of the aircraft at least one electric signal representative of said at least one pressure signal to on board the aircraft;

obtaining via a first sensor outside of the aircraft a measurement of a position corresponding to the at least one pressure sensor in said undisturbed zone, obtaining via a second sensor on-board the aircraft a measurement of a position corresponding to the aircraft, and determining via an on-board system on the aircraft at least one pressure measurement firstly from said at least one transmitted electric signal and secondly from the position of the at least one pressure sensor in said undisturbed zone relative to the position of the aircraft, determining the position of the undisturbed zone and the position of the predetermined zone of the aircraft using two DGPS sensors suitable for receiving position information coming from a same constellation of satellites, determining using the on-board system a corrected pressure measurement at a known altitude at which a Pitot tube on board the aircraft is located, and calibrating the on-board Pitot tube using the corrected static pressure measurement.

24. The method according to claim 23, wherein the step of obtaining at least one pressure signal is performed from a static pressure intake.

25. The method according to claim 24, wherein it includes a step of conveying said at least one pressure signal to the at least one pressure sensor.

26. The method according to claim 25, wherein it includes a step performed by said at least one pressure sensor of transforming said at least one pressure signal into at least one electric signal representative of said at least one pressure signal.

27. The method according to claim 23, wherein the constellation of satellites comprises at least three satellites.

28. The method according to claim 23, wherein the measured pressure is a reference pressure.

29. The method according to claim 23, wherein the at least one electric signal representative of the measured pressure is transmitted through an electric cable by which the at least one pressure sensor is connected to the aircraft.

30. The method according to claim 23, wherein the on board system determines a corrected pressure measurement at a known altitude at which a Pitot tube on board the aircraft is located, and wherein the corrected static pressure measurement is used to calibrate the on-board Pitot tube.

31. The method according to claim 23, wherein the on-board system includes standard atmosphere tables available that establish correspondence between altitude and pressure.

* * * * *